Oct. 21, 1969  J. HUGGINS  3,473,321
HYDRAULIC TRANSMISSIONS FOR VEHICLES
Filed Dec. 18, 1967  3 Sheets-Sheet 1
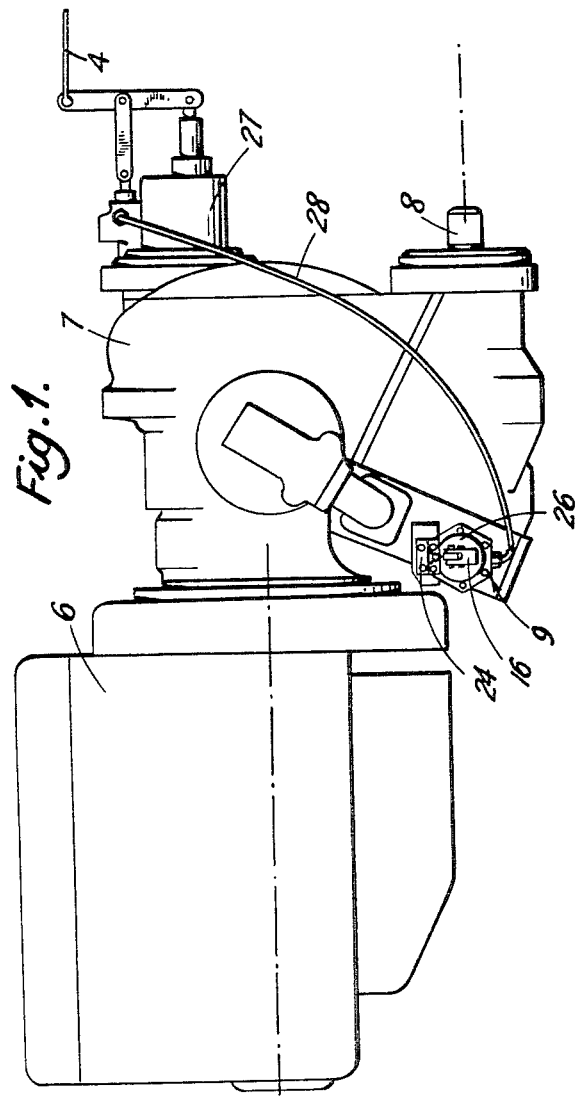

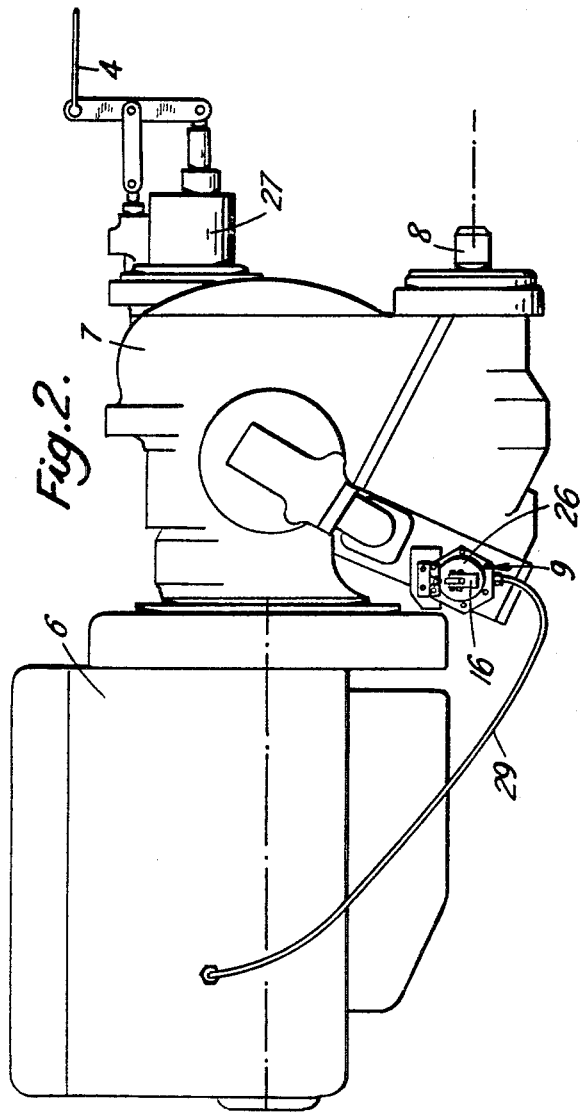

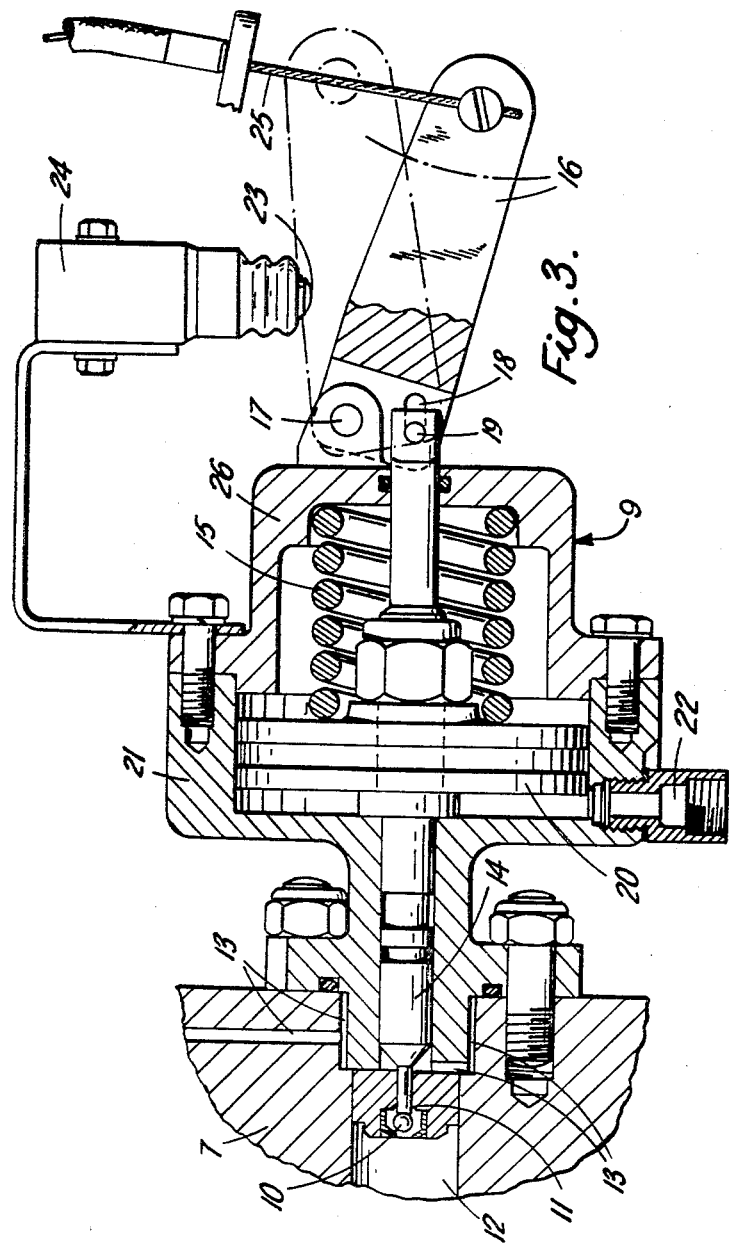

United States Patent Office 3,473,321
Patented Oct. 21, 1969

3,473,321
HYDRAULIC TRANSMISSIONS FOR VEHICLES
John Huggins, Basingstoke, England, assignor to Lansing Bagnall Limited, Basingstoke, England, a British company
Filed Dec. 18, 1967, Ser. No. 691,524
Claims priority, application Great Britain, Dec. 21, 1966, 57,259/66
Int. Cl. F16d *31/00, 33/00;* F15b *15/18*
U.S. Cl. 60—19       7 Claims

ABSTRACT OF THE DISCLOSURE

A hydraulic transmission unit for a vehicle employing a high pressure system and operable by a prime-mover includes a loading and unloading valve for the high pressure system which has a connection to and is operable by another pressure system, the pressure of which, on starting the prime-mover, is increased sufficiently to operate the valve to load the high pressure system of the transmission unit, the reduction of pressure in the other pressure system, on stopping the prime-mover, allowing the valve to be operated to unload the high pressure system.

---

This invention relates to hydraulic transmission units for vehicles, the transmission units being of the kind which employ a high pressure system and a valve which is capable of loading or unloading the high pressure system. These transmission units are operable by a prime-mover (e.g. an internal combustion engine) when the valve has first been operated to load the system.

According to the invention a vehicle transmission unit of the above kind is characterised in that the loading and unloading valve has a connection to and is operable by another pressure system, the pressure of which, on starting the prime-mover, is increased sufficiently to operate the valve to load the high pressure system of the transmission unit, the reduction of pressure in the other pressure system, on stopping the prime-mover, allowing the valve to be operated to unload the high pressure system.

In one form of the invention, the other pressure system is a low pressure system forming part of the hydraulic transmission unit.

In another form of the invention, the prime-mover is an internal-combustion engine and the said other pressure system is the low pressure oil system of the engine.

Preferably the valve is operable to unload the high pressure system by spring means.

The valve may be a ball valve having a plunger for disengaging the ball from a valve seat, which plunger is spring urged towards the ball, the pressure of the spring being capable of disengaging the ball from its valve seat and hence unloading the high pressure system. In this case, the plunger may have a piston part which is acted on by the said other pressure system whereby when its pressure is increased sufficiently by starting the prime-mover, the plunger is moved away from the ball to overcome the spring pressure and to allow the ball to engage its valve seat, the high pressure system thereby being loaded.

It is preferred that the valve is also provided with manually-operated means for causing it to load the high pressure system. The transmission unit may thus be provided with a hydraulic lock so that when the high pressure system has been loaded manually, the system may be used as a parking brake for a vehicle.

It is also preferred that in the case of the valve having a plunger as described above, when the said movement of the plunger away from the ball is effected by the other pressure system, the movement of the plunger is independent of the means provided for manually producing the same effect, means may also be provided for preventing the prime-mover from being started when the valve has been manually-operated to load the high pressure system.

The invention also includes an industrial lift truck having a hydraulic transmission unit as described above.

By way of example, two embodiments will now be described with reference to the accompanying drawings in which:

FIGURE 1 is a diagrammatic side elevation of a hydraulic transmission unit employing a high pressure system and a loading and unloading valve therefor, the valve being operable by the low pressure system of the transmission unit;

FIGURE 2 is a similar view to that shown in FIGURE 1 of an alternative hydraulic transmission unit, the loading and unloading valve for the high pressure system being operable by the low pressure system of an internal-combustion engine; and FIGURE 3 is a cross-sectional elevation of the loading and unloading valve which forms a part of both of the units shown in FIGURES 1 and 2, some of the parts associated with the valve being shown in elevation.

Each embodiment described below concerns an industrial lift truck or other vehicle provided with an internal combustion engine 6 and a hydraulic transmission unit 7 for transmitting the drive from the internal combustion engine to one or more ground wheels. The transmission unit 7 incorporates a variable displaceable pump driven by the internal combustion engine 6 and a fixed displacement motor which is powered by the pump and which has an output shaft 8 connected to the driven ground wheel or wheels of the vehicle. The transmission unit is supplied with oil through a high pressure system and an associated low pressure system, the high pressure system connecting the pump and the motor of the unit and the low pressure system including a gear pump whereby the high pressure system is kept primed. In order for the high pressure system of the transmission unit to be operative, it is necessary for the system to be closed or loaded, and yet it is advantageous that it should be possible to unload the system, i.e. to allow the oil to flow into a reservoir tank also included in the low pressure system. The transmission unit is also designed such that the pressure of the low pressure system is increased by operation of the internal combustion engine. The transmission unit is operable to propel the vehicle in either a forward or reverse direction and the speed of the vehicle is controlled by a hand throttle for the engine and a combined speed and direction controller (e.g. pedals) connected by a link 24 to a servo-valve 27 forming part of the transmission unit. Such a hydraulic transmission unit is well known and need not be described in greater detail.

This invention is concerned with the means provided for loading and unloading the high pressure system of the transmission unit and these means will now be described.

The loading and unloading means comprise a valve 9 which when it is closed, loads the high pressure system and which when it is open, unloads the high pressure system. With reference to FIGURE 3, this valve 9 comprises a ball 10 which is engageable with a valve seat 11 to isolate a connection 12 to the high pressure system from connections 13 to the above-mentioned reservoir tank in the low pressure system. The ball 10 is held in its disengaged position, as shown, by a plunger 14 which is urged into contact with the ball 10 by a spring 15. However, the plunger 14 is manually movable to the right as viewed in FIGURE 3 by upward movement of a lever 16 which is pivotally mounted at 17 to the valve housing 26 and is connected to the free end of the plunger by means of a slot 18 in the lever engaging with a pin 19 fixed to the plunger adjacent its free end. Such movement of the plunger allows the ball 10 to engage the valve seat 11 and to load the high pressure system. A Bowden cable 25 is provided to operate the lever 16, which cable has one end connected to the lever and its other end (not shown) connected to a control lever for operation by the driver of the vehicle. The position of the lever 16 which effects loading of the high pressure system is shown in chain-lines, the lever being moved into its upper chain-line position by pulling the Bowden cable 25. When upward pressure on the lever by the Bowden cable is removed, the spring 15 is capable of returning the plunger into its forward position in which the high pressure system is unloaded, the lever 16 being simultaneously returned to its lower full-line position.

It is to be appreciated that the provision of the slot 18 in the lever 16 allows the plunger 14 to be moved between its extreme positions independently of the lever 16, whereby second means can be provided for controlling the valve 9. The second control means comprise an oil pressure system, which, in the embodiment shown in FIGURE 1 comprises the low pressure system of the transmission unit and, in the embodiment shown in FIGURE 2, comprises the low pressure system of the internal combustion engine. In each case, the pressure of the oil pressure system increases when the engine is started and decreases when the engine is stopped. This pressure differential is used to operate the plunger 14 in a manner that will now be described.

The plunger 14 is provided with an enlarged piston part 20, the rear side of which is engaged by the aforesaid spring 15. The cylinder 21 for the piston 20 is connected at 22 to the low pressure system of the transmission unit by a pipe 28 (FIGURE 1) or to the low pressure system of the engine by a pipe 29 (FIGURE 2) so that when the engine is started, the increase in pressure in the respective low pressure system will cause the piston and hence the plunger 14 to be moved to the right as viewed in FIGURE 3 and thus the high presure system to be loaded. Stopping of the engine will reduce the pressure of the respective low pressure ssytem to allow the spring 15 to return the plunger into its position as shown and hence to effect unloading of the high pressure system.

The high pressure system may thus be loaded manually by means of the lever 16 and the Bowden cable 25, or automatically by starting the engine, in each case the high pressure system being unloaded by the spring 15.

A further feature of the loading and unloading valve is that when the lever 16 is in its chain-line position and hence the high pressure system is loaded, the lever 16 will depress the plunger 23 of a micro-switch 24 and disconnect the starter motor of the engine. The engine cannot then be started until the lever 16 has been moved to unload the high pressure system. The provision of this feature is advantageous since, when the high pressure system is manually loaded by moving the lever 16 into its chain-line position, the high pressure system will act as a hydraulic lock for the transmission unit and thus as a parking brake for the vehicle, e.g. for use when the vehicle is on an incline.

I claim:
1. A hydraulic transmission unit for a vehicle comprising: a high pressure system and a valve which is capable of loading and unloading the high pressure system and which unit is operable by a prime mover when the valve has first been operated to load the system; the loading and unloading valve having a connection to and being operable by another pressure system, the pressure of which, on starting the prime mover, is increased sufficiently to operate the valve to load the high pressure system of the transmission unit, the reduction of pressure in the other pressure system, on stopping the prime mover, allowing the valve to be operated to unload the high pressure system, said loading and unloading valve being a ball valve having a plunger for disengaging the ball from a valve seat, which plunger is urged by a spring towards the ball, the pressure of the spring being capable of disengaging the ball from its valve seat and hence unloading the high pressure system.

2. A hydraulic transmission unit as claimed in claim 1 in which the plunger has a piston part which is acted on by the said other pressure system whereby when its pressure is increased sufficiently by starting the prime-mover, the plunger is moved away from the ball to overcome the spring pressure and to allow the ball to engage its valve seat, the high pressure system thereby being loaded.

3. A hydraulic transmission unit as claimed in claim 1 in which the valve is also provided with manually-operated means for causing it to load the high pressure system and in which when the said movement of the plunger away from the ball is effected by the other pressure system, the movement of the plunger is independent of the means provided for manually producing the same effect.

4. A hydraulic transmission unit as claimed in claim 3 in which the manually-operated means comprise a lever pivotally mounted on the valve housing, which lever is capable of moving the plunger away from the ball.

5. A hydraulic transmission unit as claimed in claim 3 in which means are provided for preventing the prime-mover from being started when the valve has been manually-operated to load the high pressure system.

6. A hydraulic transmission unit as claimed in claim 5 in which the manually-operated means comprise a lever pivotally mounted on the valve housing, which lever is capable of moving the plunger away from the ball and in which the said means provided for preventing the prime-mover from being started comprise a plunger-operated microswitch which is actuated by the lever when it has effected loading of the high pressure system.

7. A hydraulic transmission unit for a vehicle comprising: an internal combustion engine driving a high pressure hydraulic system; a shut-off valve operable to load and unload the high pressure system; a low pressure oil system lubricating the internal combustion engine; a connection between said shut-off valve and the low pressure oil system; the valve being operable by increase of the pressure of the oil system, on starting the engine, to load the high pressure system, the reduction of the pressure of the oil system, on stopping the engine, allowing the valve to be operated to unload the high pressure system.

References Cited
UNITED STATES PATENTS 3,135,087 6/1964 Ebert _____ 60—19
3,153,900 10/1964 Pigeroulet et al. _____ 60—19

EDGAR W. GEOGHEGAN, Primary Examiner

U.S. Cl. X.R.:

60—52; 184—6